CROSS REFERENCE
EXAMINER 255
Dec. 30, 1969 W. J. TOULIS 3,487,464
SUPERDIRECTIVE TRANSMITTING AND RECEIVING ARRAY
Filed March 15, 1968
2 Sheets-Sheet 1
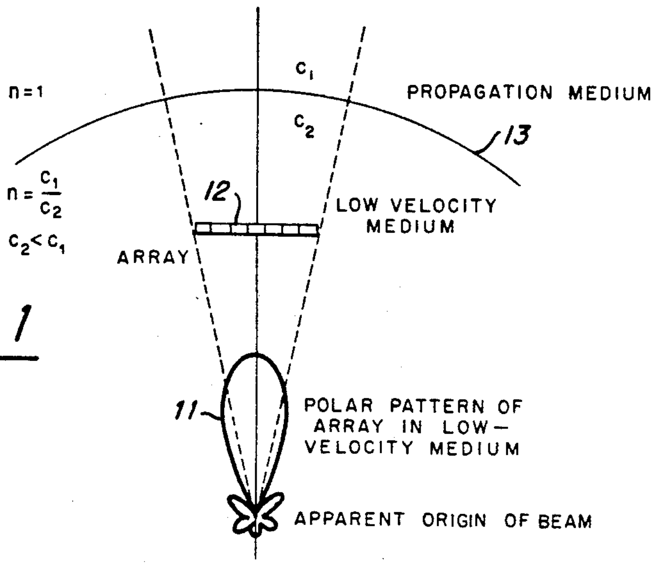
FIG. 1
FIG. 2
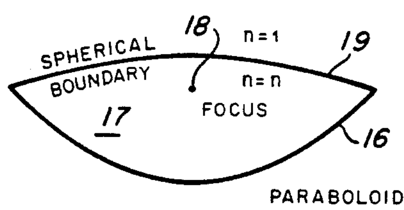
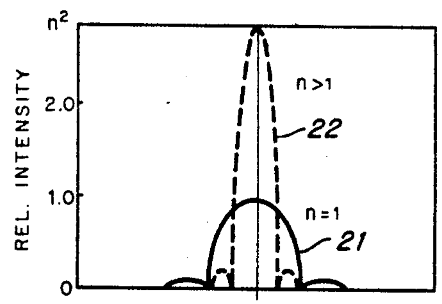
FIG. 3
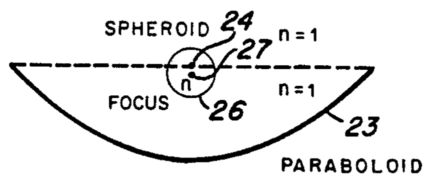
FIG. 4
INVENTOR.
WILLIAM J. TOULIS
BY
Richard K. Macneill FIG. 5
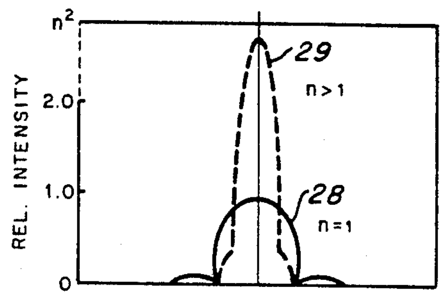
FIG. 6
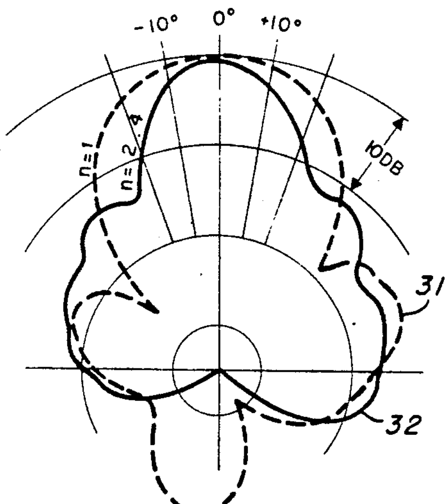
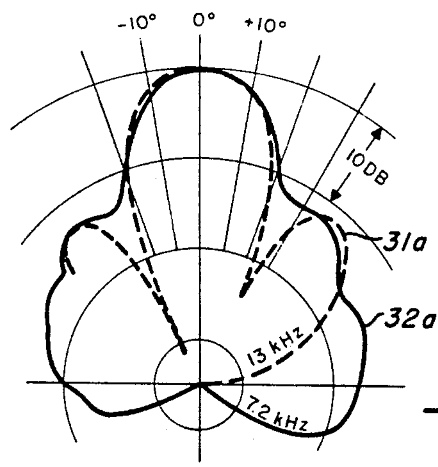
FIG. 7
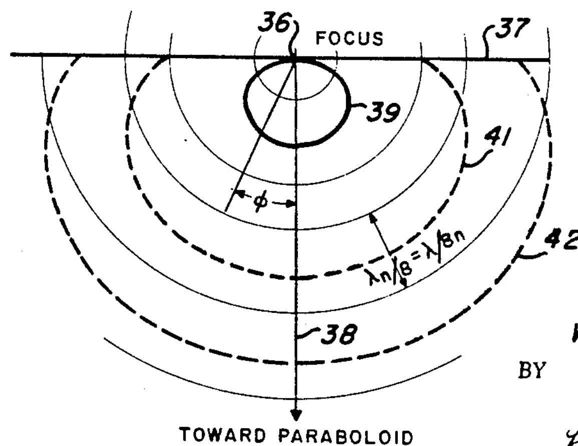
FIG. 8
INVENTOR.
WILLIAM J. TOULIS
BY
Richard K. Macneill 3,487,464
Patented Dec. 30, 1969

3,487,464

SUPERDIRECTIVE TRANSMITTING AND RECEIVING ARRAY

William J. Toulis, 2453 Marseilles Way, Costa Mesa, Calif. 92627

Filed Mar. 15, 1968, Ser. No. 713,402
Int. Cl. H01q *19/10*
U.S. Cl. 343—755 4 Claims

ABSTRACT OF THE DISCLOSURE

A superdirective transmitting and receiving array for transmitting and receiving energy having an energy-feed element and an energy-focusing means such as a paraboloid reflector in operable proximity with the energy-feed element; a low-velocity medium having dimensions comparable to the focal region of the energy-focusing means to a predetermined power level such as the half-power points. The energy-feed element being immersed within the low-velocity medium and mounted substantially at the focal point of the energy-focusing means.

BACKGROUND OF THE INVENTION

The present invention relates to a superdirective energy transmitting and receiving array and more particularly to a superdirective energy transmitting and receiving array utilizing a medium whose wave velocity is less than in the enveloping or propagation medium in order to attain superdirective state.

The inherently poor radiation loading characteristics and the resultant inefficiency which is encountered with multipole superdirective arrays may be by-passed through reliance on low-velocity media to scale down the dimensions of a normal beam-forming array. The resultant beam may be transferred intact from the low to the high velocity medium if the boundary coincides with the curvature of the radiated wavefront so that the emergent rays do not bend or refract in a direction to degrade the directivity of the polar pattern. The curved boundary of an engulfed multi-element beam-forming array in a low-velocity medium should extend at least over the effective aperture of the array; with focusing arrays, such as a paraboloid, the boundary and the amount of low-velocity material may be restricted essentially to the small volume occupied by the concentrated wave energy at the focus. Hence, with appropriate media, an order of magnitude reduction in size or a comparable increase in directivity is feasible for both transmitting and receiving arrays in sonar, radar, and related fields. Preliminary measurements with a small low-velocity sphere at the focal region of a paraboloid confirm the existence of the superdirective action.

It is well known that the polar pattern and directive gain of an array depend directly on the effective area of the aperture and inversely on the square of the wave length in the enveloping medium. For example, with a properly designed acoustic array, the beam width will be narrower in air when compared to measurements with the same array in water by a factor of the ratio of the wave velocities (in meters/sec.): 1450/340 equals 4.27; the corresponding improvement in the power gain is the factor $(4.27)^2$ equaling 18.2. Apparently, this improvement in resolving power should be attainable also in water if the beam is formed with an array in an air pocket surrounded by water. This would be a practical scheme if the disparity in the density of the two media were not as great and if refractive bending dispersion could be avoided at the boundary between the two media. The latter factor can be resolved with a boundary that coincides with the wavefront so that the rays are normal to it. The mismatch due to the disparity in the two densities represents a practically hopeless situation for an air-water combination, but other low-velocity materials are available in the sonar and radar fields which match much better into the propagation medium.

An object of the present invention is the provision of a superdirective transmitting and receiving array for increasing the directivity of a given physical array size, or maintaining substantially the same directivity at a lower frequency.

Another object is the provision of a superdirective transmitting and receiving array which utilizes a low-velocity medium to engulf effectively an energy-feed element of the array.

A further object of the invention is the provision of a superdirective transmitting and receiving array which is compatible with existing arrays.

Yet another object is the provision of superdirective transmitting and receiving arrays which are simple and inexpensive to manufacture and install.

Other objects and many of the attendant advantages of the invention will become more readily apparent with reference to the following detailed description when considered in conjunction with the drawings in which:

FIG. 1 is a schematic representation of the type of geometry which is required to transfer intact the beam formed by an array in a low-velocity medium to the enveloping propagation medium;

FIG. 2 is a schematic representation of a paraboloid engulfed completely in a medium having a wave velocity lower than that of the propagation medium;

FIG. 3 illustrates a radiation pattern resulting from the embodiment of FIG. 2 in comparison with a standard prior art radiation pattern;

FIG. 4 is a schematic representation of the present invention as utilized with a standard paraboloid reflector;

FIG. 5 illustrates the radiation pattern of the embodiment of FIG. 4 with and without utilizing the present invention;

FIG. 6 illustrates the experimental results showing the radiation pattern with and without a low-velocity liquid (in a ping-pong ball) utilized at the focal point of a thirteen-inch paraboloid at the same frequencies;

FIG. 7 illustrates the comparative radiation pattern at different frequencies with and without the low-velocity sphere;

FIG. 8 illustrates three radial distributions of a low-velocity medium at a paraboloidal focal area as preferred alternatives to the simple sphere.

Referring to FIG. 1, a polar pattern of an array in a low-velocity medium is shown generally at 11 with an array at 12 with a line 13 delineating between a low-velocity medium and the propagation medium.

Referring to FIG. 2, a paraboloid is shown at 16 engulfed in a low-velocity medium 17 having a feed element 18 located at its focal point with a line 19 delineating between medium 17 and the propagation medium.

Referring to FIG. 3, a first curve 21 illustrates the radiation pattern of paraboloid 16 without the utilization of a low-velocity medium and a second pattern 22 utilizing a low-velocity medium 17 as shown in FIG. 2.

Referring to FIG. 4, a paraboloid is shown at 23 having a feed element 24 located at the focal point of paraboloid 23 and a low-velocity medium spheroid 26 engulfing feed element 24 and with spheroid center 27 displaced from feed element 24.

Referring to FIG. 5, the radiation pattern of paraboloid 23 without spheroid 26 is shown at 28 and the radiation pattern of paraboloid 23 with spheroid 26, as shown in FIG. 4, is illustrated by curve 29.

Referring to FIG. 6, the comparative polar patterns are shown for a given frequency with a thirteen-inch paraboloid having a ping-pong ball at its focus with a fluorine liquid compound (3M's FC–77) in the ping-pong ball at 32 and with water in the ping-pong ball 31.

Referring to FIG. 7, comparative patterns are shown at two frequencies with FC–77 in a ping-pong ball.

Referring to FIG. 8, a graph is shown illustrating three radial distributions of a low-velocity medium at a paraboloidal focus for improved performance over a simple sphere.

THEORY OF OPERATION

Referring back to FIG. 1, it appears that the beam-forming arrangement represents a contradiction to the well-established wave theory on arrays. The form of the polar pattern is pre-ordained by the amplitude and phase distribution at a convenient aperture plane in the propagation medium; furthermore, the smallest aperture in this medium for a given polar pattern corresponds to a plane array with uniform amplitude and constant phase; thus, an equivalent distribution at a wavefront in the same medium cannot exist unless it coincides with this smallest aperture or extends over a larger surface.

If the above paragraph is a fair summary of the generally accepted wave theory for arrays, then the theory fails to account for the much smaller wavefronts which are generated by multipole arrays. More specifically, the beam-forming arrays can be small compared to the wavelength in the propagation medium provided the phase may be shifted by 180° from element to element in the array. At great distances, the resultant polar pattern from a multipole can be designed to be indistinguishable from that of a much larger conventional array of optimum design. At a distance comparable to the diameter of the conventional array, its polar pattern seems to distort severely whereas that for the equivalent multipole remains undistorted. Thus, the far-field form of the multipole array is retained to much shorter distances than with the conventional array; the dipole is the simplest beam-forming multipole array that exhibits such distinctive characteristics. This unusual behavior suggests that the accepted solution to the wave equation represents only the first approximation and, therefore, higher order terms must be included for a satisfactory solution. An analytical study by L. J. Chu of the fields radiated by multipoles has relied on a complete set of orthogonal spherical wave functions to account for the field that propagates radially outward. (Ref.: L. J. Chu, Physical Limitations of Omnidirectional Antennas, J. Appl. Phys. 19, 1163–1175, 1948.)

If the radiated field generated in the propagation medium is to be commensurate with both a multipole array and a conventional array in a low-velocity medium, then the amplitude-phase distribution in the design of the multipole array may be considered to create an equivalent but artificial low-velocity medium. However, unlike the real low-velocity medium, the artificially created medium may couple very poorly into the propagation medium. This severe contrast is due to the 180° phase shift in the adjacent elements of the multipole array when compared to the uniform or slowly varying phase in the elements of the superdirective or engulfed conventional array.

SUPERDIRECTIVITY WITH FOCUSING ARRAYS

Although superdirectivity has been discussed in terms of a general type of beam-forming array, additional perspective is gained by examining arrangements (such as paraboloids, horns, lenses . . . ) which tend to concentrate the wave energy into a focus. FIG. 2 depicts the case of a paraboloid which is engulfed in a low-velocity medium in the manner of FIG. 1. Inasmuch as the directive gain of a paraboloid is directly proportional to the intensity at the focus relative to that in space, then the gain should increase in the manner of FIG. 3 as the velocity of the engulfing medium is reduced relative to the propogation medium. Only the low-viscosity medium in the focal volume is critically essential to the superdirective process. As a result, only the feed of the paraboloid needs to be engulfed in the manner shown in FIG. 4 for comparable supergain.

The feed for the paraboloid should be engulfed in a spherical enclosure whose minimum diameter is consistent with the focal volume at the lowest frequency of interest; the effective diameter of this volume is at least one-third the wavelength in the low-velocity medium. Such spherical symmetry is essentially justified with extremely sharp beams wherein the curved boundary at the wavefront tends to merge into a plane boundary. For more finite beamwidths, some spherical assymmetry is essential to avoid broadening of the main lobe due to refractive bending. Actually, some displacement of the spheroidal enclosure off the focal point along the axis of the paraboloid should lead toward the appropriate curvature of the wavefront as shown in FIGS. 1 and 2; that is, radial assymmetry is necessary for the feed enclosure at the focus because the apparent origin of the radiated wavefronts does not necessarily coincide with the focal point.

Analytically, the behavior of the two types of superdirective paraboloids in FIGS. 2 and 4 may be described in terms of the rate of change in the phase which is presented in space by the paraboloid aperture. The superdirective action suggests that the effective phase is both modulated and multiplied in the ratio of the wave velocities that exist in the adjoining media. This ratio of the velocity in the propagation medium to that in the low-velocity medium is generally termed the index of refraction $n$. However, the basic intent in the superdirective arrangements is to increase the rate of change in the phase while minimizing refractive bending so that the boundary tends to coincide with the wavefront.

SPHERICAL LENSES

Although the so-called thin lenses consist of low-velocity media, they have never been noted for any superdirective characteristics. This is apparently true also for Luneberg lenses but not for spherical lenses of uniform index of refraction when the focus occurs within the refractive medium. Preliminary experimental evidence suggests that superdirective gains of 3–5 db are inherently feasible with an acoustical lens when the focus is close to the outer surface of the sphere. Unfortunately, this improvement tends to decrease rather than increase as the focal point moves well into the lens with the higher indices of refraction.

An analytical investigation of the beam-forming capabilities of a uniform-index lens shows that the width of the main lobe is independent of the index of refraction as it approaches infinitely large values. This phenomenon is due to the fact that the focal position shifts toward the lens center and the subtended angle is invariant even though the effective focal volume decreases inversely with the index of refraction; as a result, the superdirective action is counteracted and neutralized by having to accept the lens center as the reference point for rotation. This is in sharp contrast to the paraboloid wherein the focal distance is independent of the index of refraction.

In spite of the qualified superdirectivity which is attained with spherical lenses of uniform index, the contrastive behavior between these and thin lenses suggests that most, if not all, of the superdirective action arises from the low-velocity medium in the focal volume. As a result, lenses should be designed to provide the preferred focal distance with the least amount of refractive matter while conserving highly refractive matter only for the feed at the focus in the manner already suggested for the paraboloid in FIG. 4. In this respect, the Luneberg lens ($n^2$ equals $2-r^2$) requires the least amount of matter for a spherical configuration whereas the spherical lens with a uniform index of refraction of about 1.85 may prove to be the simplest to construct if the focus is to coincide with the outer surface of the sphere.

Although the focal volume is spherical in its smallest dimensions, this may not be the case for preferred array configurations. Consequently, conventional feeds may be used if they are scaled down in proportion to the index of refraction of the engulfing medium. However, the useful bandwidth might be restricted appreciably unless the characteristic impedance of the low-velocity medium approaches and preferably exceeds that in the propagation medium. From this point of view, materials with high indices of refraction should have comparable dielectric and permeability constants for superdirective electromagnetic antennas; in the underwater sound field, the corresponding factors are the density and compressibility constants. In the absence of such beneficient factors, the feed may be scaled down only partially as this action tends to improve radiation loading in the low-velocity media with characteristic impedances lower than in space.

Reflection losses at the boundary between two mismatched media may be appreciable and thus set a limit to the superdirective gain with very high indices of refraction. Consequently, tapered or matching sections will be essential for optimum performance.

The downward scaling of feeds may also reduce the power handling capacity. However, engulfment of an electromagnetic feed in a solid rather than in a gaseous refractive medium should improve its power handling abilities if heat dissipation is not a limiting factor.

EXAMPLES OF LOW-VELOCITY MEDIA

For electromagnetic waves

Inasmuch as most of all materials have wave velocities lower than that in air and in empty space, there is a wide choice of electrically nonconducting materials for the design of superdirective feeds. However, the wave velocity may vary appreciably with the operational frequency, and consequently, references such as: Tables of Dielectric Materials, vol. IV, Laboratory for Insulation Research, MIT Technical Report 57, should be consulted for more specific values. Some of the appropriate materials may be described as follows:

(1) Plastics are convenient, but their wave velocities tend to vary appreciably with various samples.

(2) Glasses are more stable, but difficult to modify mechanically.

(3) Rubbers, such as neoprene, are more flexible but the wave velocity is not greatly lower than in space.

(4) Liquids (such as ethanol and distilled water) require specially shaped containers.

(5) Ferrites offer improved matching characteristics to the propagation medium provided energy absorption is not severe at the operating frequency.

(6) Artificial dielectrics and composite configurations with low average wave velocity are also of pertinent significance.

For acoustical waves

Although there are quite a few materials with acoustic wave velocities lower than that in water, there are very few materials whose acoustic speed is less than one-half that of water. Among these, the fluorochemical liquids (such as 3M's FC–77, fluorolube oil and hexadecafluoroheptane) are the most promising. Among the more common liquids, carbon tetrachloride and methyl alcohol have wave velocities which lie between water and the fluorochemical liquids; methyl silicones of low viscosity are usable also.

Wave velocities lower than those of the fluorochemicals may be created artifically through reliance on compliant tubes in water or some other convenient liquid.

MEASUREMENTS WITH PARABOLOID

In order to verify the concept shown in FIG. 4, a 13-inch paraboloid with F/D equaling 3.70/13 equaling 0.28, was prepared for polar pattern measurements with underwater sound. The parabolic surface was lined with cell-tite rubber which is known to reflect underwater sound very efficiently at the shallow calibration depths. The hydrophone was essentially a ¼ inch O.D. piezoceramic cylinder of comparable length. A ping-pong ball, 1.40 inches in diameter, was used to house the hydrophone and the low-velocity liquid. The latter (3M's fluorine compound FC–77) has a sound-speed of about 600 meters/sec. which is down by a factor of 2.40 when compared to the 1450 meters/sec. in water. On the assumption that nearly ideal superdirective action is discernable when the sphere diameter is at least one-third the wavelength of sound in the low-velocity medium, then this condition should be satisfied at 6 kHz. and higher frequencies. The half-power beamwidth (at this frequency) should be 46° for a 13-inch circular piston in water and 19° for a fully superdirective arrangement with $n$ equaling 2.40.

Preliminary and rather meager measurements yielded polar patterns which were recorded with the sensor at various distances from the apex of the paraboloid to the center of the ping-pong ball: 3.37, 3.75 and 3.87 inches (with the hydrophone at the center of the ball and cell-tite 2 inches in diameter directly behind the ball). Of these, the 3.37 inch position failed to yield significant results in the 6–9 kHz. band; the 3.75 inch position suggested some superdirective action at about 8 kHz.; and the 3.87 inch position showed quite distinctive characteristics in the 6–8 kHz. band. Optimum results were observed at about 7.2 kHz. as in FIG. 6, wherein the directivity index is almost 2 db higher when compared to a circular piston of the same diameter. Additional measurements with FC–77 in the ball were discontinued later as a result of badly unbalanced polar patterns due to flimsiness in the structure that supports the sensor in the paraboloid.

Some measurements with water in the ping-pong ball were also made and one of these is shown in FIG. 6 as a contrast to the superior pattern with the FC–77 fill. The relative supergain between the two patterns is about 3–4 db. Potentially, more supergain might be expected with further adjustments in the focal position. Extrapolation of the initial data suggests that a focal distance greater than 3.87 inches should lead to an optimum frequency closer to 6 kHz. with improved superdirective action.

FIG. 7 compares the optimum pattern 32*a* at 7.2 kHz. with another pattern 31*a* which was recorded at 13 kHz., but at a focal distance of 4.06 inches. The similarity between them is surprisingly close and this upgrading of the 7.2 kHz. pattern 32*a* suggests a relative supergain of about 4–5 db. Although the beam width of the 13 kHz. pattern 31*a* is nearly normal, its first side lobe is somewhat high at only 12–13 db below the main lobe. This discrepancy seems to be due in part to a less than optimum focal position and in part to an irregular parabolic surface. Consequently, supergains approaching 20 log (2.4) equaling 7.6 db should be potentially feasible after the pertinent components are optimized.

The experimental results with the small refractive sphere at the focus of a paraboloid indicate that the superdirective action occurs primarily when the sphere diameter is roughly one-third the wavelength in the low-velocity medium. Furthermore, the position of the sphere along the paraboloidal axis is closely critical if maximum superdirectivity is to be observed. The latter factor is not inconsistent with the assumption that the sphere should be offset toward the paraboloid from the focal position in order to match better the curvature at the interface for the appropriate wavefront. On the other hand, the former observation favoring a small sphere of a specific diameter, tends to indicate an upper limit on the size of the engulfing medium. Therefore, it can be deduced that if the experimental evidence for a small sphere contradicts theoretical expectations, then the two observations can be reconciled only if a true sphere does not fulfill closely the wavefront conditions.

The spherical assymmetry, which is required for the low-velocity medium along the axis of the paraboloid, is confirmed further by attempting to recreate the exact shape of the spheroid from the curvature at the interface in FIG. 2 on the assumption that ray theory applies. The resultant shape is shown in FIG. 8. The solid curve 39 represents the amount $x$ of the low-velocity material which must be added radially onto a true sphere in order to provide a more suitable boundary condition than is possible with a simple sphere; the analytical expression for this excess amount is:

$$x \text{ equals } \frac{\lambda n}{4} \frac{(\cos \phi - \cos^2 \phi)}{(\sin^2 \phi)}$$

where $\phi$ is the spatial angle relative to the paraboloidal axis through the focal point; $\lambda n$ is the wavelength of the wave energy in the low-velocity medium whose applicable index of refraction is $n$. Inasmuch as the correctional amount represented by the solid curve 39 in FIG. 8 is likely to be insufficiently large to approach the full superdirective state, then it may be enlarged by adding it on to simple spheres in the manner suggested by the two dashed curves in FIG. 8.

It should be noted that the preferred shapes 39, 41 and 42, in FIG. 8 for the low-velocity medium are reminiscent of the shape of an oblate spheroid, i.e., with the lower curvature surface toward the paraboloid. As a result, if this minor deformation in the shaping of the feed were to be simulated with a true sphere, then the sphere would be offset away from, rather than toward the paraboloid which is required by the prime curvature correction factor. Thus, the two shaping factors for attaining the appropriate wavefront with a true sphere require contradictory offsets. Consequently, the full amount of the superdirectivity is not likely to be realized without a more appropriate spheroid than a sphere.

Even though spheres smaller than the focal volume may provide most of the appropriate curvature, they are not sufficiently large to concentrate all of the wave energy for maximum superdirectivity. Consequently, somewhat larger spheroidal configurations would be preferred if a more effective shaping factor can be assigned to it. This optimally shaped spheroid can be designed only at a particular frequency for maximum superdirectivity. In general, it should be located in the lower usable frequency band for an essentially constant beam width response over a fairly large range of frequencies.

It should be noted that the precise shape of the spheroid defined in FIG. 8 assumes that the paraboloids in FIGS.

2 and 4 are to be used as transmitters. When, however, they are considered as receivers, the preferred ray theory curvature at the interface is a plane surface. This discrepancy is not especially severe as the maximum correction in FIG. 8 corresponds to a phase delay of only 45°.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. A superdirective energy-focusing system comprising:
at least one energy-feed means;
an energy-focusing means in operable proximity with said at least one energy-feed means;
a low-velocity medium, said low-velocity medium having substantially the same dimensions and shape as, but a lower wave velocity than in the immediate proximity of the focal regions of said energy-focusing means to a predetermined power level; and
said at least one energy-feed means immersed within the said low-velocity medium and mounted substantially at the focal point of said energy-focusing means.

2. The superdirective energy-focusing system of claim 1 wherein:
said low-velocity medium is substantially spheroidal in shape.

3. The superdirective energy-focusing system of claim 1 wherein:
the center of said low-velocity medium is displaced from the focal point of said energy-focusing means.

4. The superdirective energy-focusing system of claim 1 wherein:
said low-velocity medium has an oblate spheroid shape.

References Cited

UNITED STATES PATENTS 3,331,073 7/1967 Horst ............ 343—755

RODNEY D. BENNETT, Jr., Primary Examiner

M. F. HUBLER, Assistant Examiner

U.S. Cl. X.R.

343—840, 911